(12) United States Patent
Schliesser et al.

(10) Patent No.: US 8,934,861 B2
(45) Date of Patent: Jan. 13, 2015

(54) TECHNIQUE FOR MONITORING A CALL (75) Inventors: Roland Schliesser, Würselen (DE);
Martin Kaibel, Herzogenrath (DE);
Ulrich Leschinski, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 417 days.

(21) Appl. No.: 13/395,598

(22) PCT Filed: Sep. 23, 2009

(86) PCT No.: PCT/EP2009/006880
§ 371 (c)(1),
(2), (4) Date: Mar. 27, 2012

(87) PCT Pub. No.: WO2011/035794
PCT Pub. Date: Mar. 31, 2011

(65) Prior Publication Data
US 2012/0178413 A1 Jul. 12, 2012

(51) Int. Cl.
*H04M 11/00* (2006.01)
*H04L 29/06* (2006.01)
(Continued)

(52) U.S. Cl.
CPC ............ *H04L 65/1043* (2013.01); *H04L 12/14* (2013.01); *H04L 12/1439* (2013.01);
(Continued)

(58) Field of Classification Search
CPC ............... H04W 4/025; H04W 76/028; H04L 65/1043; H04L 43/106; H04L 12/14; H04L 12/1439; H04L 65/1046; H04L 69/40; H04M 15/00; H04M 15/58; H04M 15/73; H04M 15/70
USPC ........... 455/423, 405–408; 370/395.2, 395.21
See application file for complete search history.

(56) References Cited

U.S. PATENT DOCUMENTS 7,533,174 B1 5/2009 Lynch
2003/0195848 A1* 10/2003 Felger ........................... 705/40
(Continued)

FOREIGN PATENT DOCUMENTS

EP 1804479 A1 7/2007

OTHER PUBLICATIONS

3GPP TS 29.332 V8.6.0 (Jun. 2009: "3rd Generation Partnership Project Technical Specification Group Core Network and Terminals; Media Gateway Control Function (MGCF)—IM Media Gateway; Mn Interface—Release 8"), hereinafter TS29.332.*

*Primary Examiner* — Ronald Eisner
(74) *Attorney, Agent, or Firm* — Coats & Bennett, PLLC (57) ABSTRACT

A technique for monitoring a call associated with a connection established via a Media Gateway node (MGW) is described. The Media Gateway node (MGW) is controlled by a Media Gateway Controller node (MGC). The Media Gateway node (MGW) and the Media Gateway Controller node (MGC) belong to a layered network (LN). A method implementation of this technique comprises the steps of detecting a loss of communication between the Media Gateway Controller node (MGC) and the Media Gateway node (MGW) and logging the loss of communication together with a time stamp of the detected communication loss to be used for determining a charging time of the call.

15 Claims, 7 Drawing Sheets

(51) Int. Cl.
*H04L 12/14* (2006.01)
*H04L 12/26* (2006.01)
*H04M 15/00* (2006.01)
*H04L 29/14* (2006.01)

(52) U.S. Cl.
CPC ............ *H04L 43/106* (2013.01); *H04M 15/00* (2013.01); *H04M 15/58* (2013.01); *H04M 15/70* (2013.01); *H04M 15/73* (2013.01); *H04L 65/1046* (2013.01); *H04L 69/40* (2013.01)

USPC .......................................... 455/406; 455/405

(56) References Cited

U.S. PATENT DOCUMENTS

| | | |
|---|---|---|
| 2005/0281263 A1* | 12/2005 | Miyamoto et al. ............ 370/389 |
| 2007/0140253 A1* | 6/2007 | Daigle ........................ 370/395.2 |
| 2008/0101570 A1 | 5/2008 | Cai |

* cited by examiner

TECHNIQUE FOR MONITORING A CALL

TECHNICAL FIELD

The present disclosure generally relates to a technique for monitoring a call. In particular, the disclosure is directed to monitoring a call associated with a connection established via a Media Gateway (MGW) node which is controlled by a Media Gateway Controller (MGC) node in case a loss of communication between the MGC node and the MGW node occurs.

BACKGROUND

MGC nodes and MGW nodes are network elements belonging to different layers of a communication network having a layered network architecture. In accordance with the layered network architecture, network functionality and network nodes are arranged in layers according to their specific areas of use. With regard to wireless and Internet Protocol (IP) Multimedia Subsystem (IMS) networks, layered networks are also known as networks having a softswitch architecture. With regard to wireline networks, layered networks are known as Next Generation Networks (NGN).

Figure 1:
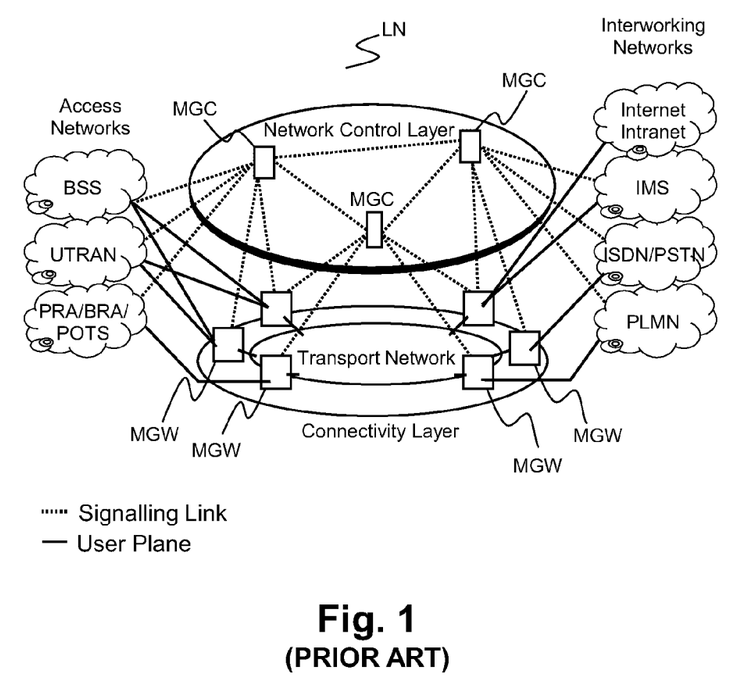
FIG. 1 is a block diagram illustrating a layered network.

FIG. 1 shows a block diagram illustrating a layered network LN which is enabling communication between access networks and interworking networks. The access networks comprise a Base Station Subsystem (BSS), a Universal Mobile Communications System (UMTS) Terrestrial Radio Access Network (UTRAN), a Primary Rate Access (PRA), a Basic Rate Access (BRA), and a Plain Old Telephone Service (POTS). The interworking networks comprise the Internet, an Intranet, an IMS, an Integrated Services Digital Network (ISDN), a Public Switched Telephone Network (PSTN), and a Public Land Mobile Network (PLMN).

Layered network LN comprises a Network Control Layer and a Connectivity Layer. A plurality of MGC nodes belong to the Network Control Layer. MGC nodes are also known as softswitches or call agents. In case the layered network LN is a $3^{rd}$ Generation Partnership Project (3GPP) circuit switched core network, the MGC nodes are Mobile Switching Center (MSC) servers. The MGC nodes are responsible for controlling mobility management, the setup and release of calls and sessions requested by end users, circuit-mode supplementary services, security, and similar functions. The MGC nodes further handle traffic control, access and core network signaling, subscriber service handling, and collecting of call charging data in Call Data Records (CDR).

A plurality of MGW nodes constituting a transport network belong to the Connectivity Layer. Within the Connectivity Layer, transportation of any type of information, i.e., user plane data, is provided via voice, data and multimedia streams.

The MGC nodes and the MGW nodes, i.e., the Network Control layer and the Connectivity Layer, may be physically separated from each other. The MGC nodes and the MGW nodes are connected via signaling links. The signaling links may be Time Division Multiplex (TDM), Asynchronous Transfer Mode (ATM), and/or IP signaling links. A plurality of signaling transfer points, IP routers, and/or cable connections may be provided within the signaling links. The MGC nodes control the MGW nodes based on Gateway Control Protocol (GCP) signaling via the signaling links.

For 3GPP standardized networks, the protocol used for the interface between MGC nodes and MGW nodes is based on the H.248 protocol specified by the International Telecommunication Union Telecommunication Standardization Sector (ITU-T). The interface is described in document 3GPP TS 29.232 V8.7.0 "$3^{rd}$ Generation Partnership Project; Technical Specification Group Core Network and Terminals; Media Gateway Controller (MGC); Media Gateway (MGW) Interface; Stage 3, Release 8". Furthermore, the protocol used for the Media Gateway Controller Function (MGCF)—IM Media Gateway (IM-MGW) interface is described in document 3GPP TS 29.332 V8.6.0 "$3^{rd}$ Generation Partnership Project; Technical Specification Group Core Network and Terminals; Media Gateway Control Function (MGCF)—IM Media Gateway; Mn Interface; (Release 8)".

Determining an exact charging time for a call is critical for the end user and for cooperating network operators which are charging calls to one another. A charging time of a call associated with a connection established via a MGW node is usually determined based on call related information written into a CDR. For this, the MGC node controlling the MGW node via which the connection is established writes information regarding the start time and the end time of the call (or a duration of the call) into the CDR. Based on this CDR data, the call time is charged to the end user or a network operator.

However, due to the separation between the MGC nodes and the MGW nodes in different network layers, i.e., the separation of call control and bearer control, over-charging of calls may happen in case a loss of communication between an MGC node and an MGW node occurs.

Figure 2A:
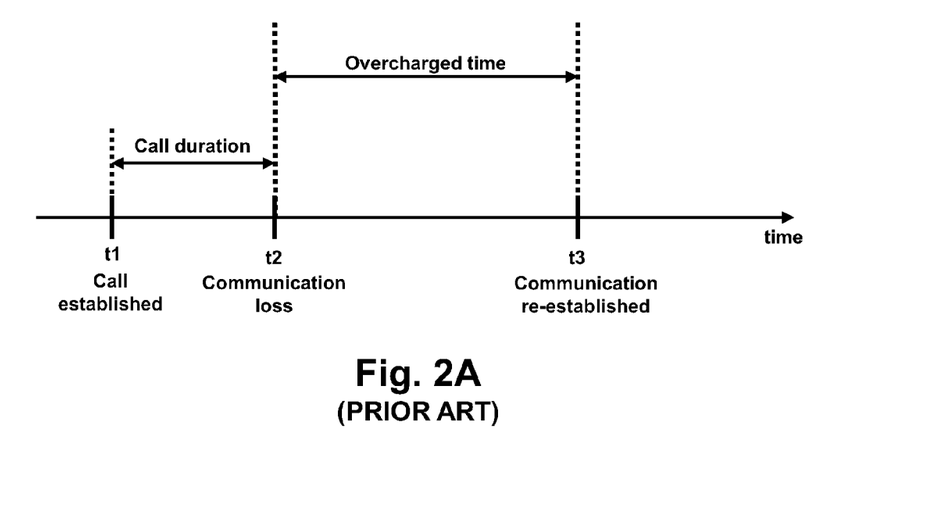
FIG. 2A is a time diagram illustrating a first call overcharging example.

A first call overcharging example in case of a loss of communication between an MGC node and an MGW node is now explained with reference to FIG. 2A. FIG. 2A shows a time diagram of a call that is associated with a connection established via an MGW node being controlled by an MGC node.

At an initial point of time t1, the start time of the call is written by the MGC node in the CDR for the call. At a point of time t2, a loss of communication between the MGC node and the MGW node occurs. The reason for the loss of communication is a failure in the MGW node causing a restart of the MGW node. During the restart, all bearer connections of the MGW node including the bearer connection underlying the call are released. Thus, from the point of view of the end user, the call ends at point of time t2.

At point of time t3, the communication between the MGC node and the MGW node is re-established and the MGW node requests with a GCP ServiceChangeRequest command sent to the MGC node a change of service due to a restart. Accordingly, in the period of time from t2 to t3, communication between the MGC node and the MGC node is interrupted.

In networks having a layered network architecture, if a loss of communication between an MGC node and an MGW node occurs, the MGC node considers the MGW node to be operational until the connection between the MGC node and the MGW node is re-established, i.e., until the MGW node reports its status with a GCP message to the MGC node. At the point of time t3, the MGC node is informed by the MGW node that the MGW node has released all bearer connections during its restart. Thus, at the point of time t3, the MGC node releases the call and writes the release time t3 into the CDR. Accordingly, when determining the charging time of the call based on the CDR data, the actual duration of the call from t1 to t2 is overcharged by the period of time from t2 to t3.

Figure 2B:
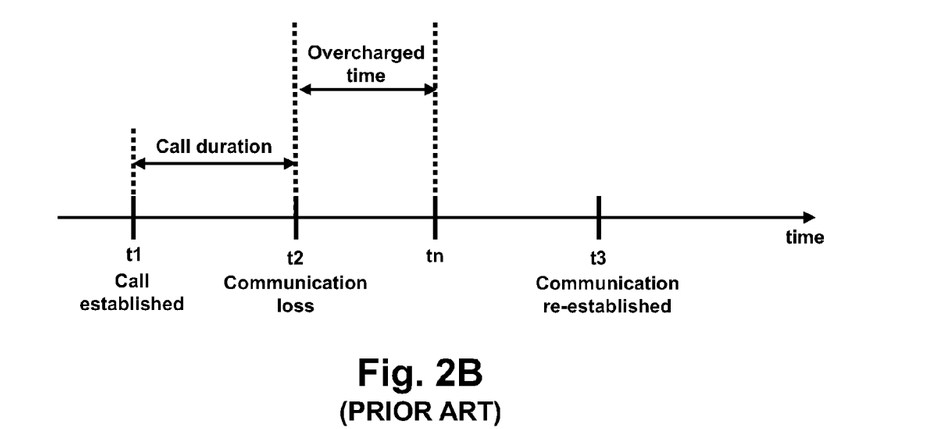
FIG. 2B is a time diagram illustrating a second call overcharging example.

In the following, a second call overcharging example is explained with reference to FIG. 2B. The example of FIG. 2B is identical to the example of FIG. 2A except that at a point of time tn, the call is released by the end user or the network. In this case, the call release time tn is written into the CDR. Thus, the actual duration of the call from t1 and t2 is overcharged by the period of time from t2 to tn.

In order to provide more exact call charging, a real-time charging mechanism is known. This real-time charging mechanism is described in document "Realizing realtime charging" by Jaco Fourie, Ericsson Review No. 3, 2006. For real-time charging, not the entire chargeable duration is measured in one piece, but the MGC node measures the call duration in relatively small consecutive time segments. However, if real-time charging is employed, the above explained overcharging still occurs during the last segment of the call.

Document EP 1 521 391 A1 describes a method for charging calls in a communication network. To avoid overcharging, a polling mechanism is proposed during which the MGC node requests from the MGW node information on which connections are still active. However, polling is not possible in case the communication between the MGC node and the MGW node has been lost.

SUMMARY

Accordingly, a technique for monitoring a call associated with a connection established via an MGW node, in particular, in case of loss of communication between an MGC node and the MGW node, is needed.

According to a first aspect, a method for monitoring a call associated with a connection established via an MGW node, the MGW node being controlled by an MGC node, is provided. The method comprises the steps of detecting a loss of communication between the MGC node and the MGW node and logging the loss of communication together with a time stamp of the detected communication loss to be used for determining a charging time of the call.

The MGW node and the MGC node may be network nodes belonging to different network layers of a layered communication network. In particular, the MGC node may belong to a Network Control Layer and the MGW node may belong to a Connectivity Layer of the layered communication network. The MGC node and the MGW node may be located at physically separated locations within the layered communication network and may be connected via at least one signaling link. The MGW node and the MGC node may be any active electronic device that is attached to the network and is capable of sending, receiving and/or forwarding information via the at least one signaling link. In particular, the MGC node may be a master node and the MGW node may be a slave node. The signaling link may be or may comprise at least one of a TDM signaling link, an ATM signaling link, an IP signaling link, a signaling transfer point, an IP router, a wired link, and a wireless link. The signaling between the MGC node and the MGW node may be provided based on GCP signaling. Other network protocols enabling a connection between networks having a different structure or switching technology may also be used for the signaling.

The connection established via the MGW node may comprise at least one bearer connection underlying the call. Accordingly, the call may be associated with the at least one bearer connection.

The loss of communication between the MGC node and the MGW node may be caused by a failure (completely or partially) relating to any of the components of the layered network, e.g., a failure of the MGC node, a failure of the MGW node, and/or a failure of the signaling link between the MGC node and the MGW node. Accordingly, the loss of communication may be a complete or partial discontinuation or interruption of the communication capability between the MGC node and the MGW node. In particular, the loss of communication may be caused by an irregularity relating to the Connectivity Layer of the layered network.

The logging of the loss of communication may be implemented by logging a first identifier identifying the loss of communication between the MGC node and the MGW node together with a time stamp indicating the time when the communication loss has been detected by the MGC node. Accordingly, an association between the loss of communication and the time stamp may be logged.

After the loss of communication, i.e., upon a re-establishment of the communication between the MGC node and the MGW node, it may be determined whether the connection associated with the call is still active at the MGW node. This may be signaled by the MGW node to the MGC node with a GCP message, e.g., a GCP ServiceChangeRequest command.

In case the connection associated with the call has been determined to not be still active upon the re-establishment of the communication, the time stamp of the detected communication loss may be used for determining the charging time of the call. In particular, in case the connection associated with the call has been determined to not be still active upon the re-establishment of the communication, the time indicated by the time stamp of the communication loss may be determined as the end of the charging time of the call. In this case, it is assumed that since the connection associated with the call is no longer active upon the re-establishment of the communication between the MGC node and the MGW node, the call has ended at the point of time of the communication loss. Thus, overcharging of the call can be prevented.

In case the connection associated with the call has been determined to still be active upon the re-establishment of the communication, the re-establishment of the communication together with a time stamp of the re-establishment of the communication may be logged. For example, a second identifier indicating the re-establishment of the communication together with a time stamp indicating the time when the MGC has re-established the communication or detected the re-establishment of the communication may be logged by the MGC node.

According to a further aspect, it may be determined whether the loss of communication and the re-establishment of the communication have been logged. Depending on whether the loss of communication and the re-establishment of the communication have been logged, the charging time of the call may be determined. In particular, in case it has been determined that the first identifier indicating the loss of communication and the second identifier indicating the re-establishment of the communication have been logged by the MGC node, a release of the call by the end user or the network may be determined as the end time of the call.

According to another aspect, the time indicated by the time stamp of the communication loss may be determined as the end of the charging time in case the time indicated by the time stamp of the communication loss is later than the time indicated by the time stamp of the re-establishment of the communication. This determination of the charging time may be provided in case a logging of the loss of communication and a logging of the re-establishment of the communication have been determined.

According to a still further aspect, in case a further loss of communication between the MGC node and the MGW node has been detected, the loss of communication log may be overwritten with a new loss of communication log together with a time stamp of the further communication loss. This overwriting may be repeated in case further communication losses between the MGC node and the MGW node occur.

According to one implementation, upon a re-establishment of the communication between the MGC node and the MGW node, it may be determined whether at least one bearer connection, i.e., at least one bearer connection relating to the call, is active at the MGW node. This may be signaled to the MGC node by a GCP message from the MGW node indicating losses of bearer connections.

The loss of communication together with the time stamp of the detected communication loss may be logged into a CDR for the call. Furthermore, the re-establishment of the communication together with the time stamp indicating the time of re-establishment of the communication may be logged in the CDR for the call. According to one implementation, the first and the second identifiers together with respective time stamps may be logged by the MGC node in the CDR for the call.

After the logging, the CDR may be forwarded. For example, the CDR may be sent by the MGC node to a call charging system which determines the call charging time by analyzing the data included in the CDR, e.g., based on whether only the first identifier is written into the CDR or whether both the first and the second identifier are written into the CDR.

According to another aspect, a computer program product is provided. The computer program product comprises program code portions for performing one or more of the steps of one or more of the method aspects described herein, when the computer program product is run on at least one computing device. The computer program product may be stored on a computer-readable recording medium, such as a permanent or re-writable memory, a CD-Rom or a DVD. The computer program product may also be provided for download via one or more computer networks such as the Internet, a cellular communications network, or a wireless or a wired Local Area Network (LAN).

According to a still further aspect, an MGC node controlling an MGW node is provided. Via the MGW node, a connection is established, wherein a call is associated with the connection. The MGC node comprises a detecting circuit for detecting a loss of communication between the MGC node and the MGW node and a logging unit for logging the loss of communication together with a time stamp of the detected communication loss which is to be used for determining a charging time of the call.

The detecting circuit may be adapted for determining upon a re-establishment of the communication between the MGC node and the MGW node whether the connection associated with the call is still active at the MGW node. Furthermore, the logging unit may be adapted for logging, in case the connection associated with the call is still active upon a re-establishment of the communication between the MGC node and the MGW node, the re-establishment of the communication together with a time stamp of the re-establishment of the communication. The MGC node may further comprise a transmitter for forwarding a CDR which is configured to include at least the logged loss of communication and the time stamp of the detected loss of communication.

According to another aspect, a call charging system is provided. The call charging system comprises a receiver for receiving a CDR from an MGC node and a processor for determining a charging time of a call depending on data included in the CDR.

According to a still further aspect, a communication network is provided. The communication network comprises an MGC node, an MGW node being controlled by the MGC node, and a call charging system configured to receive CDRs from the MGC node. The communication network may be a network having a layered architecture.

According to a still further aspect, a CDR is provided. The CDR is adapted to store an indication of a loss of communication between an MGC node and an MGW node, a time stamp of the loss of communication, a re-establishment of the communication between the MGC node and the MGW node, and a time stamp of the re-establishment of the communication.

BRIEF DESCRIPTION OF THE DRAWINGS

In the following, the present technique will be described in more detail with reference to exemplar/embodiments illustrated in the drawings, wherein.

DETAILED DESCRIPTION

In the following description, for purposes of explanation and not limitation, specific details are set forth such as specific device configurations and specific communication loss scenarios in layered communication networks in order to provide a thorough understanding of the technique disclosed herein. It will be apparent to one skilled in the art that the technique may be practiced in other embodiments that depart from these specific details. Moreover, while the following embodiments will primarily be described in relation to MGC nodes and MGW nodes in a 3GPP circuit switched core network and GCP signaling, it will readily apparent that the technique described herein may also be practiced in context with other network nodes, other networks having a layered architecture, and other network protocols.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

Figure 3:
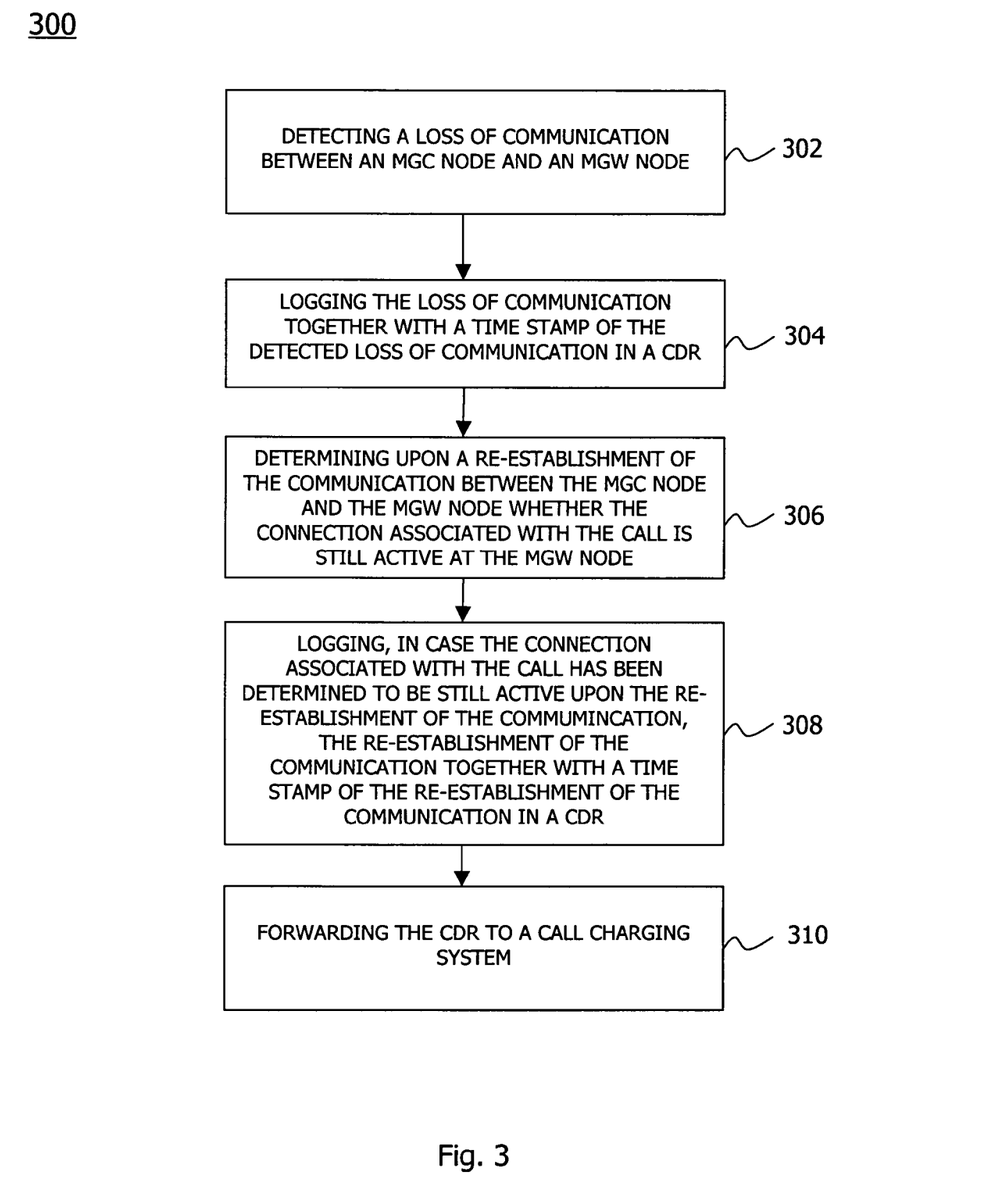
FIG. 3 is a flow-chart illustrating an embodiment of a method for monitoring a call.

Reference is now made to FIG. 3 which shows a flow chart 300 illustrating an embodiment of a call monitoring method. The method may be performed by one of the MGC nodes shown in FIG. 1.

In this embodiment, it is assumed that the MGC node controls an MGW node and that the MGC node and the MGW node belong to different network layers of a layered communication network. It is further assumed that a connection is established via the MGW node and that a call is associated with the connection. During the active call, a loss of communication between the MGC node and the MGW node occurs. The loss of communication is caused by a failure of the MGW node. The failure of the MGW node causes a restart of the MGW node and a release of all bearer connections of the MGW node. However, at the point of time of the communication loss, i.e., until a re-establishment of the communication between the MGC node and the MGW node, the MGC node does not know the reason for the loss of communication and whether the call has been affected.

Thus, in a first step 302, the loss of communication between the MGC node and the MGW node is detected by the MGC node. Thereafter, in step 304, the MGC node logs the loss of communication together with a time stamp of the detected communication loss in a CDR for the call. In particular, the MGC node logs a first identifier indicating the loss of communication together with a time stamp of the detected communication loss in the CDR.

According to an implementation of steps 302 and 304, the MGC node searches all CDRs for calls which have an active bearer connection with the MGW node affected by the loss of communication. For calls found during the search, the MGC node writes the first identifier indicating the loss of communication together with the time stamp of the detected communication loss in the CDRs for the calls.

In a subsequent step 306, upon a re-establishment of the communication between the MGC node and the MGW node, the MGC node detects whether the connection associated with the call is still active at the MGW node. Thereafter, in step 308, in case the connection associated with the call has been detected to be still active upon the re-establishment of the communication, the re-establishment of the communication together with a time stamp of the re-establishment of the communication is logged in the CDR. In particular, a second identifier indicating the re-establishment of the communication together with a time stamp of the re-establishment of the communication is written into the CDR.

In case it has been detected upon the re-establishment of the communication between the MGC node and the MGW node that the connection associated with the call is not any more active at the MGW node, i.e., that a bearer connection underlying the call has been released, the re-establishment of the communication and the time stamp of the re-establishment of the communication are not logged in the CDR. Thus, upon the re-establishment of the communication between the MGC node and the MGW node, the MGC node knows whether the call has been affected during the time of communication loss.

According to an implementation of steps 306 and 308, when the communication between the MGC node and the MGW node is re-established and the MGW node reports to the MGC node that bearer connections relating to calls have not been affected by the communication loss between the MGC node and the MGW node, the MGC node memorizes or records the time when the communication between the MGC node and the MGW node has been re-established. Then, the MGC node searches all CDRs for calls which have a bearer connection active in the MGW node. For calls found during the search, the MGC node writes the second identifier indicating the re-establishment of the communication together with the recorded time when the communication between the MGC node and the MGW node has been re-established in the respective CDRs. Calls having active bearer connections may be determined based on GCP messages received from the MGW nodes.

In case the communication between the MGC node and the MGW node is re-established and the MGW node reports to the MGC node that the bearer connections have been released, the MGC node releases all calls having bearer connections with this MGW node. In case the MGC node detects a user or network initiated release for a call, the MGC node also releases the call. A release of a call by the user or the network is written together with a time stamp into the CDR. Should the communication between the MGC node and the MGW node fail more than once, new identifiers together with new time stamps are written in an overwriting manner in the CDRs.

In a last step 310, the CDR including the communication loss log together with the associated time stamp, the communication re-establishment log together with the associated time stamp (i.e., the first and second identifiers together with the associated time stamps), and the call release identifier together with the associated time stamp are forwarded by the MGC node to a call charging system for determining a charging time of the call.

According to a further embodiment, a layered network comprising MGC nodes and MGW nodes is provided. The layered network may be the network LN shown in FIG.FIG. 1. However, contrary to the previous embodiment according to FIG. 3, it is assumed for this embodiment that during an active call via an MGW node, a loss of communication between an MGC node and the MGW node is caused by a failure of the signal-link between the MGC node and the MGW node and that the call and the bearer connection relating to the call have not been affected by the failure. In other words, although a loss of communication between the MGC node and the MGW node occurs, from the point of view of the end user, the call is not affected.

Accordingly, the MGC node logs the loss of communication together with a time stamp of the loss of communication in the CDR. Upon re-establishment of the communication between the MGC node and the MGW node, the MGC node detects that the connection associated with the call is still active at the MGW node (e.g., based on a GCP message received from the MGW node) and logs the re-establishment of the communication between the MGC node and the MGW node together with a time stamp of the re-establishment of the communication in the CDR. Once the call has been released by the user or the network, this event is logged together with a time stamp in the CDR for the call. Based on the data included in the CDR, the charging time for the call can be determined.

Figure 4:
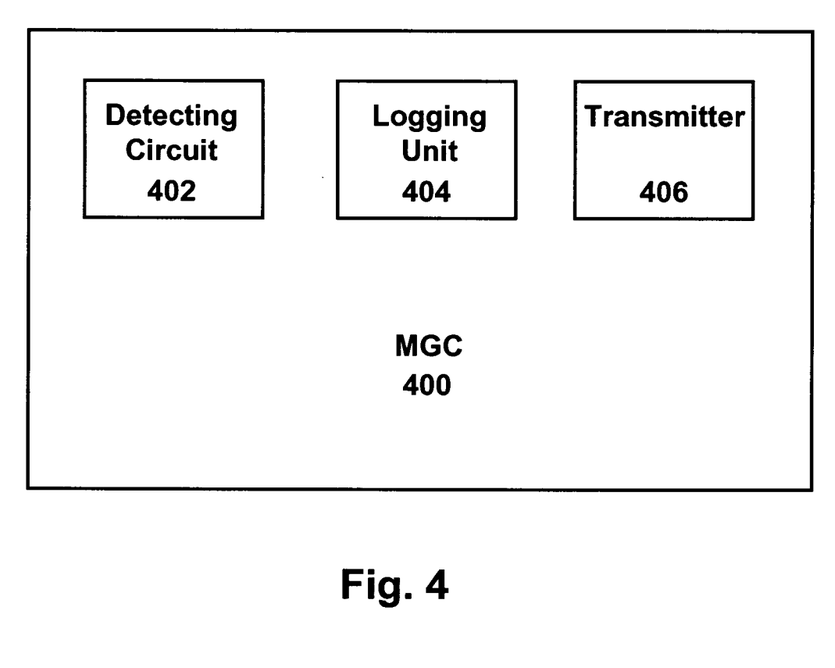
FIG. 4 is a block diagram illustrating an embodiment of an MGC node.

FIG. 4 shows a block diagram illustrating an embodiment of an MGC node 400. MGC node 400 may be one of the MGC nodes shown in FIG. 1. Furthermore, MGC node 400 may perform any of the methods of the embodiments described herein.

MGC node 400 comprises a detecting circuit 402 for detecting a loss of communication between MGC node 400 and an MGW node, a logging unit 404 for logging the loss of communication together with a time stamp of the detected communication loss, and a transmitter 406 for forwarding a CDR which is configured to include the logged loss of communication and the time stamp to a call charging system. In case the call charging system is included in MGC node 400, transmitter 404 may be omitted.

Detecting circuit 402 is adapted for determining upon a re-establishment of the communication between MGC node 400 and the MGW node whether the connection associated with the call is still active at the MGW node. Furthermore, logging unit 404 is adapted for logging, in case the connection associated with the call is still active upon the re-establishment of the communication between MGC node 400 and the MGW node, the re-establishment of the communication together with a time stamp of the re-establishment of the communication in the CDR.

Figure 5:
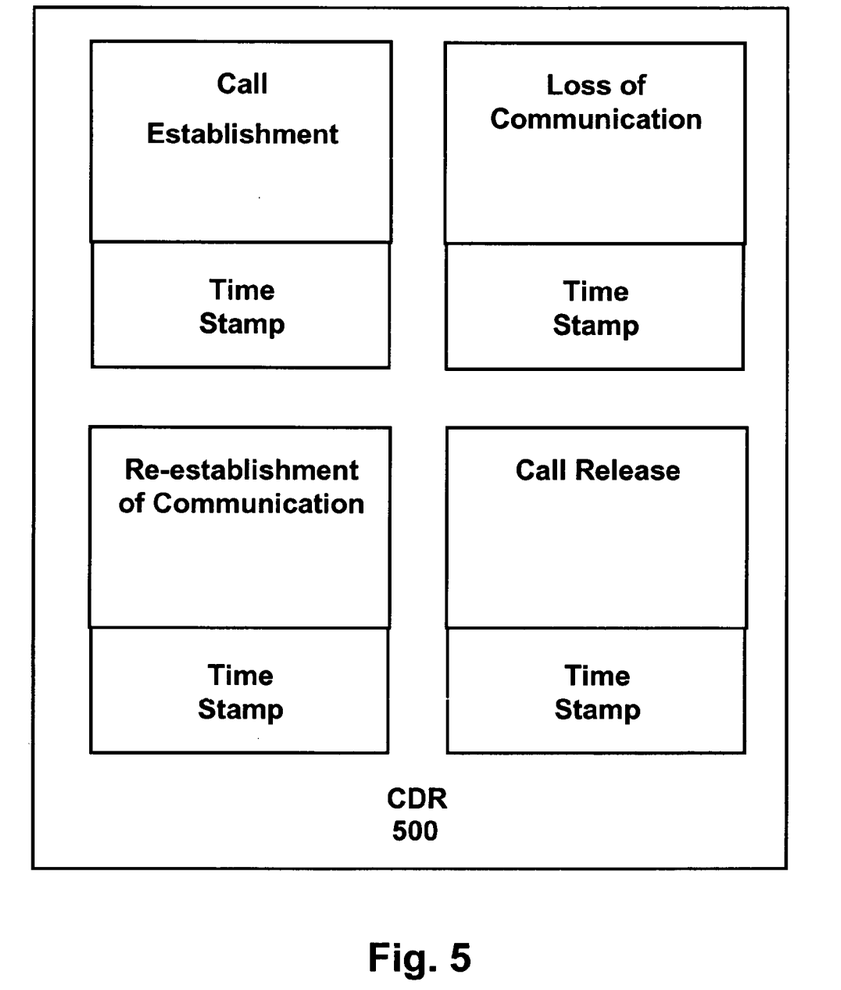
FIG. 5 is a block diagram illustrating an embodiment of a CDR.

FIG. 5 shows a block diagram illustrating an embodiment of a CDR 500. CDR 500 may be the CDR into which MGC node 400 of FIG. 4 logs communication loss and communication re-establishment data together with associated time stamps.

CDR 500 is configured to contain a call establishment identifier together with an associated time stamp, a loss of communication identifier together with an associated time stamp, a re-establishment of communication identifier together with an associated time stamp, and a call release identifier together with an associated time stamp. Further call related data may be written into CDR 500. Based on the data logged in CDR 500, i.e., the identifiers together with the associated time stamps, a charging time of a call may be determined.

Figure 6:
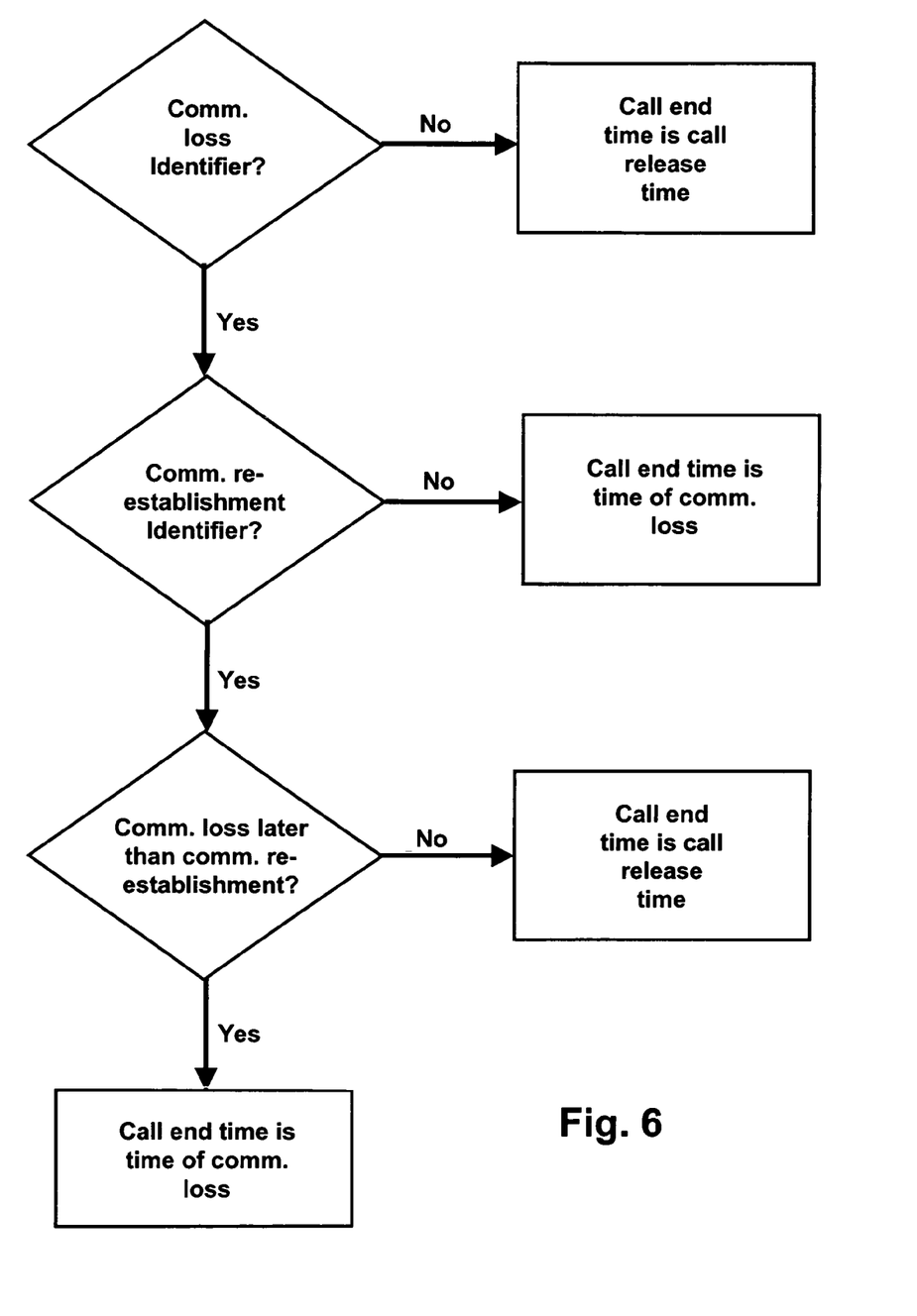
FIG. 6 is a flow-chart illustrating an embodiment of a method for charging a call.

FIG. 6 is a flow-chart illustrating an embodiment of a method for charging a call. In particular, FIG. 6 relates to determining an end time of a call to be used for call charging. The method may be executed based on data included in a CDR, e.g., CDR 500 shown in FIG. 5. The method may be performed by a call charging system and/or an MGC node, e.g., MGC node 400 shown in FIG. 4.

First of all, it is determined whether a communication loss identifier indicating a loss of communication between an MGC node and an MGW node is included in an CDR. In case no such communication loss identifier for a call is included in the CDR, a release time of the call (e.g., by the user or the network) is determined as the end time of the call. The call is accordingly charged from the start time to the determined end time of the call.

In case a communication loss identifier is included in the CDR, it is further determined whether a communication re-establishment identifier indicating a re-establishment of the communication between the MGC node and the MGW node is included in CDR. If such a communication re-establishment identifier is not included in the CDR (i.e., in case only a communication loss identifier is included in CDR), the time of the communication loss is determined as the end time of the call. The call is accordingly charged from the start time of the call until the time of the communication loss.

In case both the communication loss identifier and the communication re-establishment identifier are included in the CDR, it is further determined whether the time stamp associated with the communication loss identifier indicates a later time than the time stamp associated with the communication re-establishment identifier. In case the communication loss is not later than the communication re-establishment, a call release time (e.g., by the user or the network) is determined as the end time of the call. The call is in this case charged from the start time of the call until the determined end time. However, in case the communication loss is later than the communication re-establishment, the time of the communication loss is determined as the end time of the call. The call is thereafter charged from the start time of the call until the determined end time.

Further CDR analyzing steps may be added to the method of FIG. 6. Based on the post-processing of the CDR according to FIG. 6, a minimum chargeable call duration in case of irregularities in the Connectivity Layer of a layered network can be determined. Thereby, call overcharging can be prevented.

Figure 7:
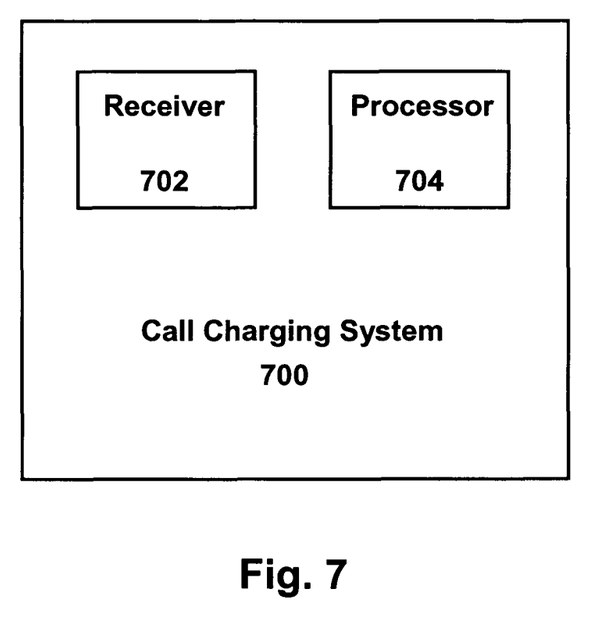
FIG. 7 is a block diagram illustrating an embodiment of a call charging system.

FIG. 7 shows a block diagram illustrating an embodiment of a call charging system 700. The call charging system 700 may be the system executing the method shown in FIG. 6. The call charging system 700 may be a separate device within a communication network. The call charging system 700 may also be included in the MGC node 400 shown in FIG. 4.

The call charging system 700 comprises a receiver 702 for receiving a CDR from an MGC node and a processor 704 for determining a charging time of a call depending on the data included in the CDR.

With the present technique for monitoring a call, it is possible to determine in a precise manner a minimum chargeable duration of a call in situations when an MGC node cannot determine the state of a bearer connection underlying a call. Thus, overcharging or over-accounting of calls to users or cooperating network operators can be prevented.

In the foregoing, principle embodiments and various modes of implementing the technique disclosed herein have been exemplarily described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method for monitoring a call associated with a connection established via a Media Gateway node, the Media Gateway node being controlled by a Media Gateway Controller node, the method comprising:
   detecting a loss of communication between the Media Gateway Controller node and the Media Gateway node;
   logging the loss of communication together with a time stamp of the detected communication loss to be used for determining a charging time of the call;
   determining, in response to a re-establishment of the communication between the Media Gateway Controller node and the Media Gateway node, whether the connection associated with the call is still active at the Media Gateway node;
   determining the charging time based on the time stamp of the detected communication loss in response to determining that the connection associated with the call is not still active upon the re-establishment of the communication between the Media Gateway Controller node and the Media Gateway node.

2. A method for monitoring a call associated with a connection established via a Media Gateway node, the Media Gateway node being controlled by a Media Gateway Controller node, the method comprising:
   detecting a loss of communication between the Media Gateway Controller node and the Media Gateway node;
   logging the loss of communication together with a time stamp of the detected communication loss to be used for determining a charging time of the call;
   determining, in response to a re-establishment of the communication between the Media Gateway Controller node and the Media Gateway node, whether the connection associated with the call is still active at the Media Gateway node;
   determining the time indicated by the time stamp of the communication loss as the end of the charging time in response to determining that the connection associated with the call is not still active upon the re-establishment of the communication between the Media Gateway Controller node and the Media Gateway node.

3. A method for monitoring a call associated with a connection established via a Media Gateway node, the Media Gateway node being controlled by a Media Gateway Controller node, the method comprising:

detecting a loss of communication between the Media Gateway Controller node and the Media Gateway node;
logging the loss of communication together with a time stamp of the detected communication loss to be used for determining a charging time of the call;
determining, in response to a re-establishment of the communication between the Media Gateway Controller node and the Media Gateway node, whether the connection associated with the call is still active at the Media Gateway node;
logging, in response to determining that the connection associated with the call is still active upon the re-establishment of the communication between the Media Gateway Controller node and the Media Gateway node, the re-establishment of the communication together with a time stamp of the re-establishment of the communication.

4. The method of claim 3, further comprising determining whether the loss of communication and the re-establishment of the communication have been logged.

5. The method of claim 4 further comprising determining the charging time depending on whether the loss of communication and the re-establishment of the communication have been logged.

6. The method of claim 3 further comprising determining the time indicated by the time stamp of the communication loss as the end of the charging time in response to the time indicated by the time stamp of the communication loss being later than the time indicated by the time stamp of the re-establishment of the communication.

7. A method for monitoring a call associated with a connection established via a Media Gateway node, the Media Gateway node being controlled by a Media Gateway Controller node, the method comprising:
detecting a loss of communication between the Media Gateway Controller node and the Media Gateway node;
logging the loss of communication together with a time stamp of the detected communication loss to be used for determining a charging time of the call;
determining, in response to a re-establishment of the communication between the Media Gateway Controller node and the Media Gateway node, whether the connection associated with the call is still active at the Media Gateway node;
overwriting, in response to detection of a further loss of communication between the Media Gateway Controller node and the Media Gateway node, a loss of communication log with a Previously presented loss of communication log together with a time stamp of the further communication loss.

8. The method of claim 1, further comprising determining, in response to a re-establishment of the communication between the Media Gateway Controller node and the Media Gateway node, whether at least one bearer connection relating to the call is still active at the Media Gateway node.

9. The method of claim 1, wherein logging the loss of communication together with a time stamp of the detected communication loss comprises logging the loss of communication together with a time stamp of the detected communication loss in a Call Data Record for the call.

10. The method of claim 9 further comprising forwarding the Call Data Record.

11. A computer program product stored in a non-transitory computer readable medium, the computer program product for controlling at least one programmable computing device, in a network having a Media Gateway node controlled by a Media Gateway Controller node, for monitoring a call associated with a connection established via the Media Gateway node, the computer program product comprising software code instructions which, when run on the at least one programmable computing device, causes the at least one programmable computing device to:
detect a loss of communication between the Media Gateway Controller node and the Media Gateway node;
log the loss of communication together with a time stamp of the detected communication loss to be used for determining a charging time of the call;
determine, in response to a re-establishment of the communication between the Media Gateway Controller node and the Media Gateway node, whether the connection associated with the call is still active at the Media Gateway node;
determine the charging time based on the time stamp of the detected communication loss in response to determining that the connection associated with the call is not still active upon the re-establishment of the communication between the Media Gateway Controller node and the Media Gateway node.

12. A Media Gateway Controller node controlling a Media Gateway node via which a connection is established, wherein a call is associated with the connection, the Media Gateway Controller node comprising:
a detecting circuit configured to detect a loss of communication between the Media Gateway Controller node and the Media Gateway node;
a logging unit configured to log the loss of communication together with a time stamp of the detected communication loss which is to be used for determining a charging time of the call;
wherein the detecting circuit is further configured to determine, in response to a re-establishment of the communication between the Media Gateway Controller node and the Media Gateway node, whether the connection associated with the call is still active at the Media Gateway node;
wherein the logging unit is further configured to log, in response to the connection associated with the call being still active upon a re-establishment of the communication between the Media Gateway Controller node and the Media Gateway node, the re-establishment of the communication together with a time stamp of the re-establishment of the communication.

13. The Media Gateway Controller of claim 12:
further comprising a transmitter configured to forward a Call Data Record, the Call Data Record comprising an indication of the logged loss of communication and the time stamp;
wherein the Call Data Record further comprises an indication of a re-establishment of the communication between the Media Gateway Controller node and the Media Gateway node, and a time stamp of the re-establishment.

14. The Media Gateway Controller node of claim 12 further comprising a transmitter configured to forward a Call Data Record, the Call Data Record comprising an indication of the logged loss of communication and the time stamp.

15. A network comprising:
a Media Gateway node via which a connection is established, wherein a call is associated with the connection;
a Media Gateway Controller node controlling the Media Gateway node, the Media Gateway Controller node comprising:

a detecting circuit configured to detect a loss of communication between the Media Gateway Controller node and the Media Gateway node;

a logging unit configured to log the loss of communication together with a time stamp of the detected communication loss which is to be used for determining a charging time of the call;

wherein the detecting circuit is further configured to determine, in response to a re-establishment of the communication between the Media Gateway Controller node and the Media Gateway node, whether the connection associated with the call is still active at the Media Gateway node;

wherein the logging unit is further configured to log, in response to the connection associated with the call being still active upon a re-establishment of the communication between the Media Gateway Controller node and the Media Gateway node, the re-establishment of the communication together with a time stamp of the re-establishment of the communication;

a call charging system comprising:

a receiver configured to receive a Call Data Record from the Media Gateway Controller node; the Call Data Record comprising an indication of the logged loss of communication and the time stamp;

a processor configured to determine a charging time of a call based on data included in the Call Data Record.

* * * * *

UNITED STATES PATENT AND TRADEMARK OFFICE
CERTIFICATE OF CORRECTION

PATENT NO.        : 8,934,861 B2                          Page 1 of 1
APPLICATION NO.   : 13/395598
DATED             : January 13, 2015
INVENTOR(S)       : Schliesser et al.

It is certified that error appears in the above-identified patent and that said Letters Patent is hereby corrected as shown below:

On The Title Page, in Item (75), under "Inventors", in Column 1, Line 1, delete "Roland" and insert -- Roland H. --, therefor.

On The Title Page, in Item (75), under "Inventors", in Column 1, Line 2, delete "Martin" and insert -- Martin M. --, therefor.

In The Specification

In Column 2, Line 57, delete "writes the release" and insert -- writes the call release --, therefor.

In Column 8, Line 22, delete "FIG.FIG." and insert -- FIG. --, therefor.

In Column 8, Line 27, delete "signal-link" and insert -- signaling link --, therefor.

In Column 8, Line 60, delete "transmitter 404" and insert -- transmitter 406 --, therefor.

Signed and Sealed this
Third Day of May, 2016

Michelle K. Lee
*Director of the United States Patent and Trademark Office*